Patented Apr. 16, 1929.

1,709,241

UNITED STATES PATENT OFFICE.

HERBERT A. WINKELMANN, OF AKRON, OHIO, ASSIGNOR TO THE PHILADELPHIA RUBBER WORKS COMPANY, OF AKRON, OHIO, A CORPORATION OF DELAWARE.

MOLDABLE COMPOSITION AND METHOD OF MAKING SAME.

No Drawing.     Application filed October 28, 1927.  Serial No. 229,539.

This invention relates to moldable compositions and has for an object to produce compositions of this character which shall have improved physical properties, especially tensile and impact strength, and to provide a process for making such compositions.

It has been heretofore proposed to utilize natural and manufactured asphalts for molding operations, but products made from the asphaltic materials heretofore available have not had the requisite strength necessary to give them wide use in certain industrial operations, such for example, as the manufacture of battery containers. I have found that moldable compositions superior to those now available may be obtained by treating a mixture of an asphalt and a mineral oil flux with rubber in a manner known to the industry as blowing, where the rubber is added to the asphalt-flux mixture prior to or during the blowing action.

The distillate residues after distillation of crude petroleum of asphaltic or semi-asphaltic bases are commonly known in the trade as "fluxes", a term herein employed to designate such petroleum oil residues. It is well known that fluxes and certain other asphaltic bitumens when subjected to heat and to agitation of blasts of air blown therethrough undergo chemical changes, the character of which are not completely known but are generally considered to include polymerization and oxidation, the result of this blowing being to increase the proportion of solid or high melting hydrocarbon constituents of the materials treated, which are generally known as blown oils, blown fluxes, or blown asphalts. The purpose of this invention is to obtain by this well known process of blowing products having improved physical characteristics and which shall be better adapted for the production of molded goods, such as electrical insulation, battery containers, etc., than compositions now available for this purpose.

In carrying out this invention, I admix an asphalt, such as Gilsonite, Trinidad, or similar natural or manufactured asphalts, with a petroleum oil flux, and add thereto rubber, either in the form of crude, vulcanized or reclaimed rubber, heating the ingredients if necessary to produce an intimate admixture thereof. For reasons of economy, ground vulcanized scrap rubber is preferably employed, such as ground pneumatic tire treads or ground solid tires. This admixture is then subjected to the usual blowing operation with air until a test sample indicates a desired softening temperature, preferably in the range of from 250° F. to 350° F. according to the molding properties desired. Alternatively, the rubber may be added to the asphalt-flux mixture after the blowing thereof has progressed to a material extent, it being necessary that the rubber be blown with the asphalt-flux mixture only for a sufficient time to produce a perfect blending or homogeneous blown admixture of the three ingredients. The resulting blown products may be used directly as molding compositions or may be admixed with pigments, softeners and fibers prior to being employed for the production of molded articles.

The invention may best be understood by reference to the following examples which are illustrative in character but which are not intended to be restrictive of the invention herein described.

*Example 1.*—A molding composition embodying the distinctive characteristics of this invention was made by admixing 45 parts by weight of petroleum oil flux (450° F. flash point) with 30 parts by weight of asphalt (softening point 350° F.). These ingredients were heated and thoroughly admixed and 25 parts by weight of vulcanized rubber consisting of ground solid tires were added thereto and the admixture blown until sample test indicates that the admixture has a softening point of 265° F. The blowing operation was then discontinued and the resulting product when cooled was a jet-black, grindable solid, suitable for use directly in the manufacture of molded articles.

*Example 2.*—In making another moldable composition, similar to that of Example 1 but differing therefrom in matters of proportion, I melted together 25 parts of the flux and 50 parts of the asphalt described in Example 1 and added thereto 25 parts of vulcanized rubber consisting of ground pneumatic tire treads. This admixture was blown until a test sample thereof disclosed a melting point of 293° F. This product was very similar in its physical characteristics to the product of Example 1.

In commercial utilization of these products, it is desirable to admix them with fillers, softeners and fibers in order to produce an economical molding composition. The following examples, in which the products of Examples 1 and 2 were utilized, serve to illustrate the unusual strength and applicability to commercial operations of the molding compositions of this application.

*Example 3.*—The blown product produced by the method of Example 1 was incorporated with slate flour, Montan wax and cotton linters in the following proportions: molding composition of Example 1, 40.4 parts by weight, slate flour 45.6 parts, Montan wax 2 parts, cotton linters 12 parts. The ingredients were throughly admixed in a suitable mill and discs molded from the admixture were subjected to physical tests which showed the following remarkable properties: tensile strength at 72° F., 1760 lbs. per sq. in.; impact strength at 320° F., 5.2 lbs. per sq. in.; and a softening temperature of 147° F. It will be apparent from the above physical properties of this pigmented molding composition that strong, serviceable articles may be molded therefrom at low temperatures.

*Example 4.*—In a manner similar to that described in Example 3, the molding composition of Example 2 was admixed with slate flour, Montan wax and cotton linters in the same proportions given. A disc molded from this composition shows upon test a tensile strength at 72° F. of 1880 lbs. per sq. in.; an impact strength at 320° F. of 5.0 lbs. per sq. in., and a softening temperature of 163° F. These physical tests are of the same order as that obtained in the previous example, the tensile and softening point being slightly higher. This composition is capable of producing commercial molded goods of high quality.

It will be understood that a wide variation in the characteristics of the asphalt and the oil flux employed in the making of the molding composition and of the fillers, softeners and fibers used therewith to produce the pigmented molding composition may be employed without departing from the principles of this invention. I have also found that it is possible to substitute in whole or in part for the oil flux, vegetable oils, such as rapeseed oil, cottonseed oil, linseed oil, soyabean oil, Chinawood oil and other simple oils, such a composition as illustrated in the following example.

*Example 5.*—A molding composition having a relatively low softening point and at the same time a good tensile and impact strength of the order hereinabove referred to may be prepared by admixing with heating 15 parts of asphalt (softening point 350° F.), 57 parts oil flux (450° F. flash point) and 3 parts rapeseed oil. To these were added 25 parts of vulcanized rubber composed of ground solid tires, and the admixture was blown with air until a test sample showed a softening temperature of 304° F. The resulting product was a jet-black, grindable solid which broke with a clean glossy fracture.

The numerical values indicating the softening temperatures of the products of this specification are those determined by the ball and ring method adapted by the American Society for Testing Materials, commonly known as the A. S. T. M. standards, and may be found in the publications of this society.

It is to be understood that numerous variations and modifications may be resorted to within the scope of this invention and I do not wholly limit the claims herein to the specific procedures or products described.

I claim:

1. The method of preparing moldable compositions which comprises subjecting to heat and to a blowing action with air an admixture including an asphalt, a flux and rubber.

2. The method of preparing moldable compositions which comprises subjecting to heat and to a blowing action with air an admixture including an asphalt, a flux, a vegetable oil and rubber.

3. The method of preparing a molding composition which comprises subjecting to heat and to a blowing action with air an admixture including an asphalt, a petroleum oil flux and vulcanized rubber.

4. The method of preparing a molding composition which comprises subjecting to heat and to a blowing action with air of an admixture including an asphalt, a petroleum oil flux, a vegetable oil and vulcanized rubber.

5. The method of preparing a molding composition comprising subjecting to heat and to a blowing action with air an admixture including a petroleum oil flux, a vegetable oil and vulcanized rubber.

6. The method of preparing a molding composition which comprises admixing a pulverulent filler, a softener and fibers with the product resulting from the blowing with air of an admixture including asphalt, oil flux and rubber.

7. The method of preparing a molding composition which comprises admixing fillers, softeners and fibers with the product obtained by blowing with air under the influence of heat an asphalt, an oil flux and vulcanized rubber.

8. A molding composition comprising the product obtained by blowing in a current of air under the influence of heat an admixture including an asphalt, an oil flux and rubber.

9. A molding composition comprising the product obtained by blowing in a current of air under the influence of heat an admixture including an asphalt, an oil flux, vegetable oil and vulcanized rubber.

10. A molding composition comprising fillers, softeners, fibers and the product obtained by blowing in the presence of air under the influence of heat an admixture including asphalt, oil flux and vulcanized rubber.

11. A molding composition comprising fillers, softeners, fibers and the product obtained by blowing in the presence of air under the influence of heat an admixture including asphalt, oil flux, vegetable oil and vulcanized rubber.

In witness whereof I have hereunto set my hand this 21st day of October, 1927.

HERBERT A. WINKELMANN.